(12) United States Patent
Foina

(10) Patent No.: US 10,032,342 B1
(45) Date of Patent: Jul. 24, 2018

(54) STORAGE APPARATUS WITH ITEM COUNT FEATURE

(71) Applicant: Aislan Gomide Foina, El Cerrito, CA (US)

(72) Inventor: Aislan Gomide Foina, El Cerrito, CA (US)

( * ) Notice: Subject to any disclaimer, the term of this patent is extended or adjusted under 35 U.S.C. 154(b) by 0 days.

(21) Appl. No.: 15/345,506

(22) Filed: Nov. 7, 2016

Related U.S. Application Data

(60) Provisional application No. 62/251,618, filed on Nov. 5, 2015.

(51) Int. Cl.
*G08B 5/36* (2006.01)
*G08B 21/00* (2006.01)
*G06Q 30/00* (2012.01)
*G06F 17/00* (2006.01)

(52) U.S. Cl.
CPC ...................................... *G08B 5/36* (2013.01)

(58) Field of Classification Search
None
See application file for complete search history.

(56) References Cited

U.S. PATENT DOCUMENTS

| 2003/0078693 | A1* | 4/2003 | Chavez | G06Q 10/087 700/237 |
| 2006/0119484 | A1* | 6/2006 | Chishima | G01F 23/284 340/612 |
| 2007/0215700 | A1* | 9/2007 | Reznik | G06Q 10/08 235/385 |
| 2012/0004769 | A1* | 1/2012 | Hallenbeck | G06Q 30/06 700/232 |
| 2014/0062699 | A1* | 3/2014 | Heine | G06K 7/10009 340/572.1 |

* cited by examiner

*Primary Examiner* — Joseph Feild
*Assistant Examiner* — John Mortell
(74) *Attorney, Agent, or Firm* — Procopio, Cory, Hargreaves & Savitch LLP

(57) ABSTRACT

A storage apparatus designed to store a plurality of items and notify a user of a number of the items stored therein. A exampled implementation of a storage apparatus includes a base member having a container to store the plurality of items, a microcontroller coupled to the base member and able to generate item information pertaining to the number of items stored in the container, a color LEDs and a display operably connected to the microcontroller and able to provide a notification to the user corresponding to the item information, and a communication unit operably connected to the microcontroller and able to transmit the item information to a remote user device.

17 Claims, 5 Drawing Sheets

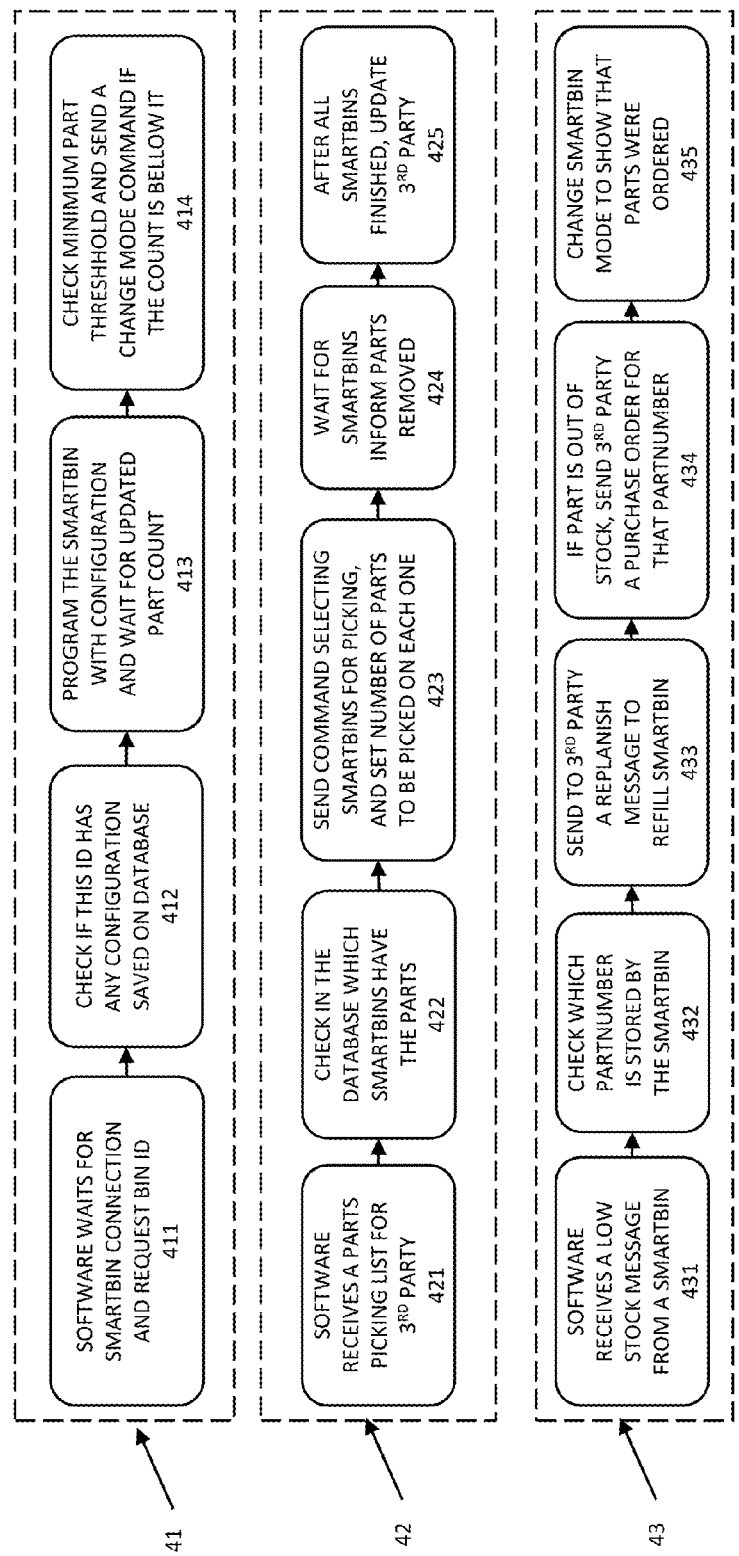

STORAGE APPARATUS WITH ITEM COUNT FEATURE

BACKGROUND

The embodiments herein relate generally to storage devices.

Individuals and companies often collect and process a plurality of items as part of their daily operations. These items may include mechanical fasteners such as screws, bolts or nuts, or electronic components such as capacitors, batteries, chips, or the like. It is critical for individuals to maintain an accurate count of the number of items stored at any given time to produce inventory records.

Current storage containers do not count the number of items stored therein unless a counter device is installed. However, these devices are limited because they do not effectively alert the user of the number of items stored both at the container site and a remote user location.

As such, there is a need in the industry for a storage apparatus with an item count feature that addresses the limitations of the prior art.

SUMMARY

Example implementation associated with the aspects of the present invention include a storage apparatus configured to store a plurality of items and notify a user of a number of the items stored therein. The storage apparatus comprises a base member comprising a container configured to store the plurality of items, a microcontroller coupled to the base member and configured to generate item information pertaining to the number of items stored in the container, color LEDs and a display operably connected to the microcontroller and configured to provide a notification to the user corresponding to the item information, and a communication unit operably connected to the microcontroller and configured to transmit the item information to a remote user device or system.

BRIEF DESCRIPTION OF THE FIGURES

The detailed description of some embodiments of the invention will be made below with reference to the accompanying figures, wherein the figures disclose one or more embodiments of the present invention.

FIG. 5 shows the inventory management system software flow, according to an example implementation.

DETAILED DESCRIPTION OF CERTAIN EMBODIMENTS

Figure 1:
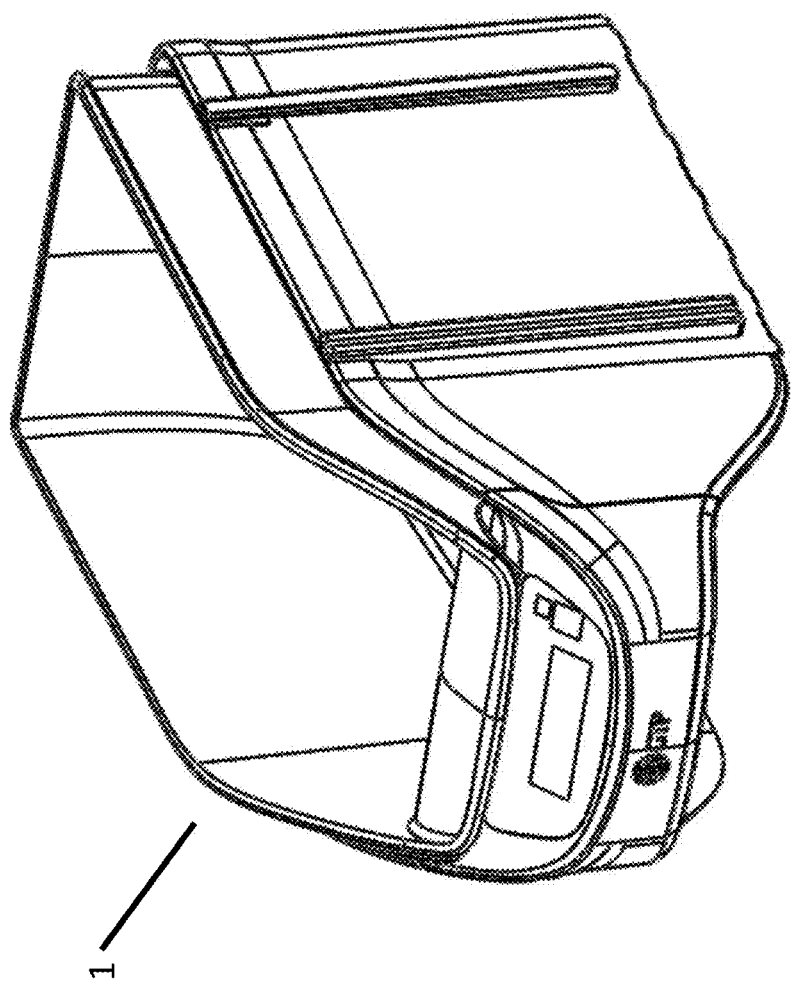
FIG. 1 shows the external view of storage apparatus, (e.g. Smartbin) assembled, according to an example implementation.
Figure 2:
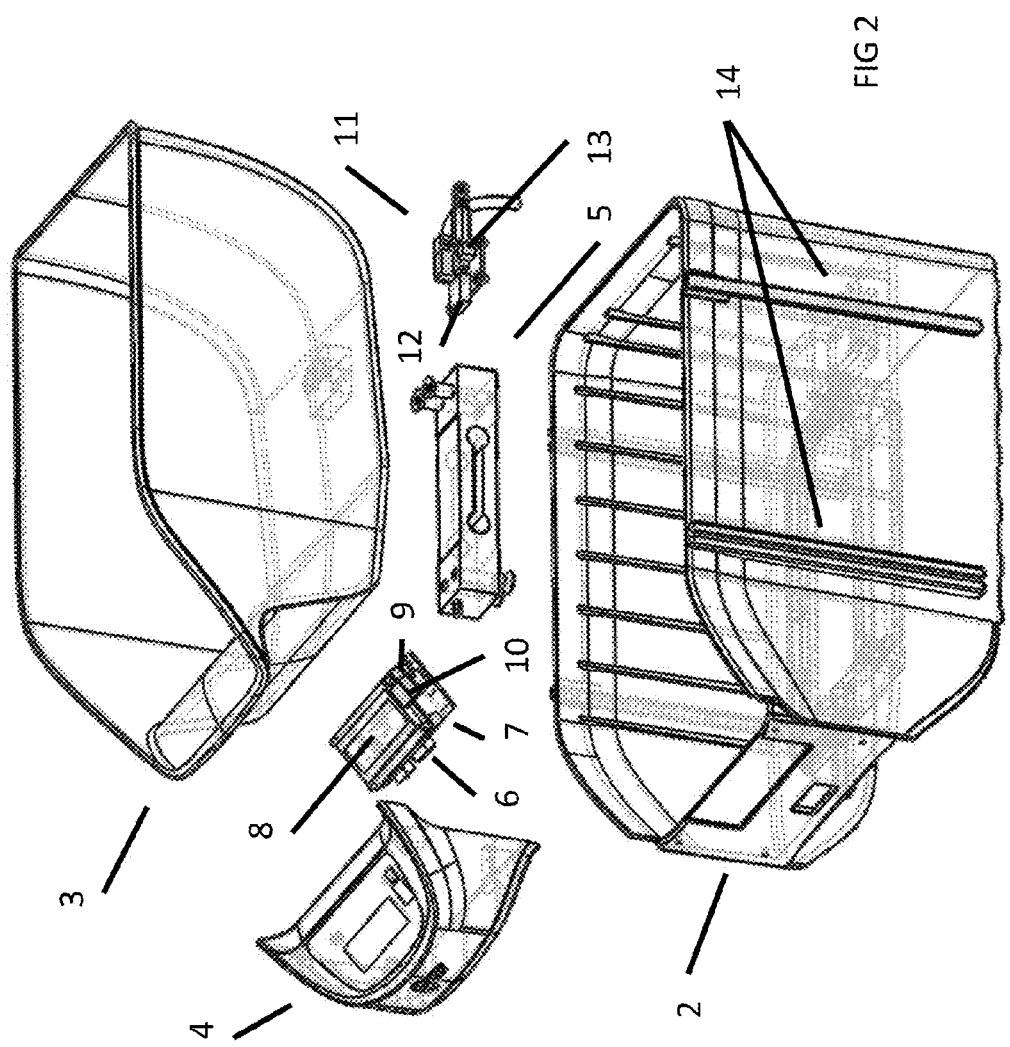
FIG. 2 shows the exploded view of the storage apparatus and its components, according to an example implementation.

The subject matter described herein is taught by way of example embodiments. Various details have been omitted for the sake of clarity and to avoid obscuring the subject matter. Examples shown below are directed to structures and functions for implementing and enabling a storage apparatus that knows in real-time how many parts it is storing, it is capable of send and receive data to other systems, and to process the information locally to show messages and alerts on its user interface.

Described here are example embodiments of systems, devices, and methods that enables a storage container to count the parts it is storing by weight, transmit this information to an inventory system, and show in a user interface the quantity and any alert or information generated locally or received from an inventory system.

The exampled storage apparatus, called as Smartbin, comprises a container with embedded electronics and a load cell capable of counting the number of parts stored based on a previous part calibration procedure. The generated part count information can be displayed on a display screen or status LEDs, or be transmitted wirelessly to a remote location.

In certain embodiments of the invention, the (1) storage apparatus (e.g. Smartbin) comprises the following components: (2) External enclosure; (3) Internal container; (4) Front panel enclosure; (5) Load cell; (6) Main printed circuit board (PCB); (7) Microcontroller; (8) Display; (9) RGB LEDs; (10) Button; (11) Back PCB; (12) Power regulator; (13) Radio transmitter/receiver; (14) Side lock to stack more units; (20) Concentrator; (21) Concentrator radio transmitter/receiver; (22) Concentrator microcontroller; (23) Data communication interface; and (24) Inventory management system.

The external enclosure holds all the components. The load cell is screwed into the enclosure, and its cable is connected to the main PCB. The back PCB also is connected through a cable to the main PCB, providing power and the radio communication to the system. The main PCB is screwed in the front panel, which is also screwed in the external enclosure. The internal container is screwed into the other side of the load cell to complete the assembly.

The Smartbin operates by using a load cell to measure the total weight of the internal container. The microcontroller receives this total weight, subtracts the empty weight of the container, and divides the remaining by the individual part's weight. The calculation determines the number of parts stored in the container, which is presented on the display and transmitted through the radio transmitter to the Smartbin concentrator (20). The empty weight and individual part weight are calculated using the calibration procedure.

The Smartbin concentrator (20) has a radio transmitter/receiver (21) connected to a microcontroller (22) to translate the data and send to an inventory system (24) through a data connection (23). In particular, the Smartbin concentrator microcontroller (22) will process the signal received by the radio receiver (21) and send the data through the data interface (23) to an inventory management system (24). The inventory management system (24) can also send messages to the Smartbin through the concentrator (20) to reset and start the calibration procedure, or to change color or turn each one of the LEDs (9) on or off, alone or together, or change the message shown on the display (8). As such, LEDs (9) and display (8) provide the user various notifications pertaining to the status or running mode of the apparatus and number of parts stored therein.

It shall be appreciated that the Smartbin displays to the user the number of parts inside the container. When the user adds or removes parts from the container, the Smartbin updates the quantity displayed and transmits the new quantity to the Smartbin concentrator. Integration with the inventory system allows the Smartbin to control picking lists and alert users of low stock. When the Smartbin has low stock, the inventory system can turn the red LED on to show the replenish team that the container needs to be replenished with parts.

Figure 3:
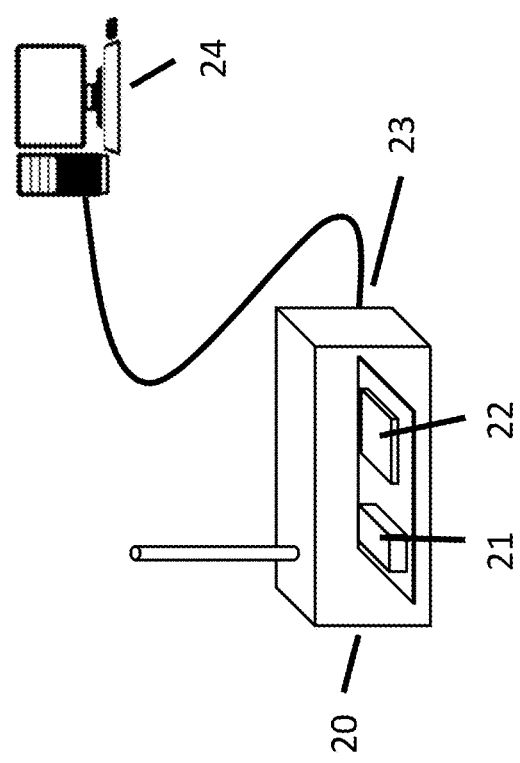
FIG. 3 shows the external view of the storage apparatus receiver, according to an example implementation.
Figure 4:
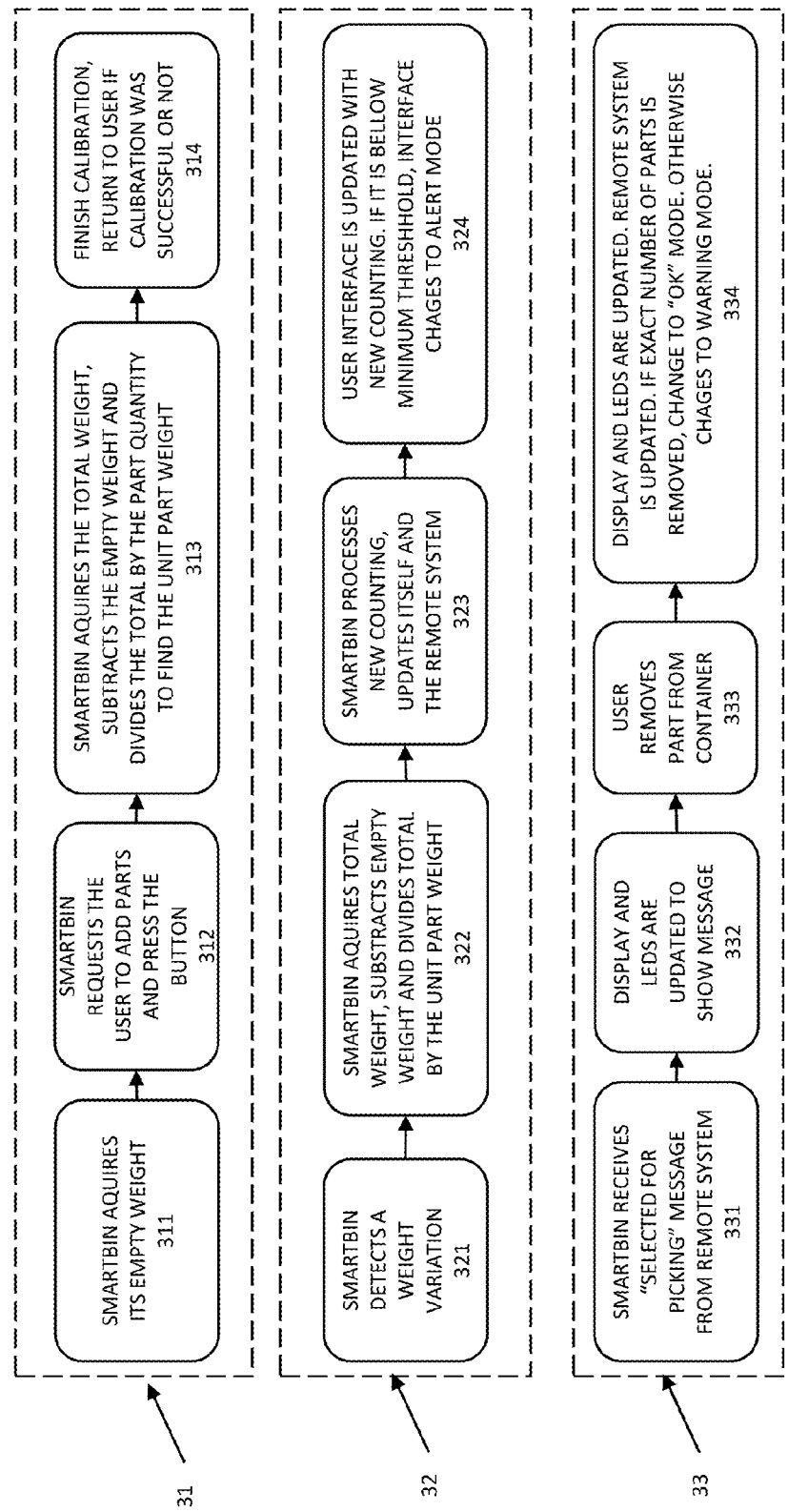
FIG. 4 shows the storage apparatus software flow, according to an example implementation.

The Smartbin microcontroller (7) is programmable and can be configured to run a plurality of different programs. An example program is show in FIG. 3. When the Smartbin is turned on, it follows the calibration software flow (31), acquiring the empty weight and storing on its memory (311). After that, the display shows a message to the user to request a specific number of parts (312) to be inserted in the internal container (3), and press the button (10) when finished. After the pressed button event is detected, the total weight is acquired and subtracted the empty weight, resulting in the load weight (313). This load weight is divided by the number of parts requested and the result is the individual part weight. The calibration procedure can request the user to repeat these steps (312) and (313) any number of times requesting different quantity of parts and comparing the individual part weight in order to find the part weight error margin. The calibration result (314) is showed in the display. If the part weight error varies above certain threshold, the calibration procedure fails and user is requested to restart calibration procedure. Otherwise, calibration is successfully finished and the Smartbin starts it operational program (32).

During the regular operation, the Smartbin is looking for weight variance on its weight sensor (321). In case a weight change occurs, the total weight is acquired and the empty weight is subtracted from it, finding the new load weight. This load weight is divided by the individual part weight stored in the memory and the result is the new part count number (322). This new information is sent to the inventory management system (24) and it is processed by the microcontroller (7) to verify if any alert condition is triggered (323). The new information is presented to the user in the display and in the LEDs (324). E.g., if the new count is below the minimum part count threshold, the Smartbin can light a red color on the LED (9) and display (8) a "need replenish" message on the display. If this Smartbin is holding parts that can only be added or subtracted with previous scheduling in the inventory system, and the part count changes, the Smartbin can blink alert colors, show alarm messages on the display (8), and send alarm messages to the inventory management system (24).

Other possible operation of the Smartbin is the facilitate a picking process (33). When the part contained in the Smartbin is selected for picking in the inventory management system (24), this system sends a message to the Smartbin informing it was selected for picking, and how many parts it is expected to be picked (331). The Smartbin updates its display (8) informing the number of parts that need to be removed from it, and the LED (9) blinks in a defined pattern or color, e.g. blue (332). When the user start to remove parts (333) from the internal container (3), the LED (9) and display (8) are updated according to the number of parts removed (334). E.g., if less than the requested number of parts was removed, the LED (9) can blink red and the display (8) shows the number of parts is still pending to be picked. If it is removed more than the requested number of parts, the LED (9) can blink yellow and the display (8) shows the number of extra parts where removed in excess. If the exact quantity is removed, the LED (9) blinks green, and turn off after a while, switching the Smartbin to the regular operation mode (32).

It shall be appreciated that the inventory management system (24) can be programmed in many ways to work with only one or a group of Smartbin. An example operation is shown in FIG. 5. When the inventory management system starts, it waits to hear from the Smartbins (411). When a Smartbin gets online, the inventory system requests its bin Id, and verify on its database for any saved configuration (412). If a saved configuration exists in the database, the inventory system configures the Smartbin with it, otherwise the Smartbin is configured with default values. The configuration can be, e.g., the unit part weight, part number and name of the part stored, or minimum part count threshold, not limited to it. After the Smartbin is configured, it sends its actual part count to the inventory system (413), or any error message. After the Smartbin inform its part count, the inventory management system can process this information and send back commands or messages to the Smartbin (414). E.g. if the part count informed by the Smartbin is below the minimum part count threshold, the inventory management system can send a command to the Smartbin to blink a red light on its LED (9).

The inventory management system (24) can also be integrated with $3^{rd}$ party systems for, e.g., automated picking (42) or for automated part replenish or order (43), but not limited to. In the automated picking example, the inventory management system receives from a $3^{rd}$ party system the picking list, with the part numbers to be pick, and quantities (421). The inventory management system checks its database to find which Smartbins have the parts (422), and sends a "select for picking message" for each one informing how many parts needs to be picked (423). The selected Smartbins receive the message and start the picking procedure (33). The inventory management system waits for updates from the selected Smartbins as soon as the parts are being removed (424). After all Smartbins report that the picking procedure was finished, the inventory management system informs the $3^{rd}$ party system about the result (425). A timeout can be programmed in the inventory management system in case the automated picking procedure delays more than a defined threshold, it sends a cancel picking message to the selected Smartbins and return an error to the $3^{rd}$ party system.

An automated replenish and order system (43) enables the user to have parts in stock, reducing operational problems due out-of-stock parts. When a Smartbin part count reaches below the minimum part count threshold, it informs the inventory management system (431). The inventory management system checks in the database which part number is stored by this Smartbin (432), and triggers a message to a $3^{rd}$ party replenish system to refill the Smartbin (433). A defined color can be set in the Smartbin LEDs (9) to make it easy to find by the replenish team. In case the $3^{rd}$ party replenish system returns an out-of-stock message, the inventory management system can trigger a message to a $3^{rd}$ party purchase system to buy more of that part number (434). The Smartbin can present a defined color pattern and message informing that more parts were purchased and are awaiting to arrive (435).

In alternative embodiments, the load cell can be changed to a different weight measuring sensor to achieve the same result. Also, the radio transmitter/receiver can be replaced by a wired communication such as Ethernet, or any other type of wireless communication such as infrared or ultrasound technologies, not limited to it. The Smartbin concentrator can also have its data connection replaced by any wired connections such as Ethernet or even a wireless connection such as Wi-Fi.

It shall be appreciated that the components of the storage apparatus described in several embodiments herein may comprise any alternative known materials in the field and be of any color, size and/or dimensions. It shall be appreciated that the storage apparatus can be stacked or locked using side locks (14) with other storage apparatus to generates, for instance, 4×1 (4 column, 1 row) Smartbin group, 1×4 (1 column, 4 row) group, 4×4 (4 column, 4 row) Smartbin cabinet, without quantity limitation for number of rows or columns. It shall be appreciated that the components of the storage apparatus described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A storage apparatus configured to store a plurality of items and notify a user of a number of the items stored therein, the storage apparatus comprising:
   a base member comprising a container configured to store the plurality of items;
   a microcontroller coupled to the base member and configured to generate item information pertaining to the number of items stored in the container, the microcontroller configured to:
   detect a change in weight of the container;
   determine a per item weight of the plurality of items;
   calculate a number of items of the plurality of items based on the detected change in weight;
   color LEDs and a display operably connected to the microcontroller and configured to provide a notification to the user corresponding to the item information and status; and
   a communication unit operably connected to the microcontroller and configured to transmit the item information to a remote device,
   wherein the microcontroller is further configured to:
      receive a quantity of parts to be picked via the communication unit;
      control at least one of the color LEDS and the display to display an indicator indicative of the received quantity of parts to be picked; and
      control at least one of the color LEDS and the display to display an indicator indicative that less than the received quantity of parts to be picked have been removed based the determined change in wait of the container.

2. The storage apparatus of claim 1, further comprising a portable system getting power from a battery or a wireless power supply, and communicating wirelessly.

3. The storage apparatus of claim 1, further comprising an external power connect configured to re-charge an internal power storage and supply power to all internal and external components.

4. The storage apparatus of claim 1, further comprising a housing that protects the device against impact and weather.

5. The storage apparatus of claim 1, wherein the remote device is an inventory system and the communication unit is configured to transmit the item information to the inventory system directly through one or more of Wi-Fi, Bluetooth, cellular network, other wireless communication systems.

6. The storage apparatus of claim 1, further comprising more than one container with individual item counting for each container.

7. A stack of storage apparatus according to claim 1, stacked vertically and/or horizontally.

8. The storage apparatus of claim 1, wherein the microcontroller is configured to control one or more of the display and LEDs to provide notifications pertaining to the status of the storage apparatus and control the communication unit to transmit the calculated number of items of the plurality of items.

9. The storage apparatus of claim 1, further comprising only one or many internal electronic boards.

10. The storage apparatus of claim 1, further comprising a wired communication system.

11. The storage apparatus of claim 1, further comprising a keyboard or a touch screen on the panel.

12. The storage apparatus of claim 1, further comprising a microphone for voice-commands.

13. The storage apparatus of claim 1, further comprising a speaker to transmit information by sound.

14. The storage apparatus of claim 1, wherein the microcontroller is configured to:
   receive a list of parts including the quantity of parts to be picked via the communication unit;
   detect an item of the plurality of items being on the received list of parts;
   detect removal of the item of the plurality of items from the container; and
   send a notification via the communication unit based on the detected removal of the item.

15. The storage apparatus of claim 1, wherein the microcontroller is configured to:
   detect the calculated number of items of the plurality of items falling below a threshold; and
   send a request to refill the container in response to the calculated number of items of the plurality of items falling below the threshold.

16. The storage apparatus of claim 15, wherein the sent request to refill the container comprises an automatically generated purchase order to a parts supplier to order a plurality of items.

17. The storage apparatus of claim 16, wherein the microcontroller is further configured to:
   control at least one of the LEDS and display to provide an indication that a plurality of items have been ordered.

* * * * *